United States Patent
Jia et al.

(10) Patent No.: US 11,265,955 B2
(45) Date of Patent: Mar. 1, 2022

(54) FACILITATION OF POWER RETENTION FOR 5G OR OTHER NEXT GENERATION NETWORK NON-STANDALONE DEVICES

(71) Applicant: AT&T Intellectual Property I, L.P., Atlanta, GA (US)

(72) Inventors: Yupeng Jia, Austin, TX (US); Inderpreet Ahluwalia, Austin, TX (US); Shah Mohammad Murshedul Arefin, Cedar Park, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 44 days.

(21) Appl. No.: 16/142,570

(22) Filed: Sep. 26, 2018

(65) Prior Publication Data

US 2020/0100315 A1    Mar. 26, 2020

(51) Int. Cl.
*H04W 76/27*    (2018.01)
*H04W 52/02*    (2009.01)
*H04W 88/02*    (2009.01)

(52) U.S. Cl.
CPC ....... *H04W 76/27* (2018.02); *H04W 52/0235* (2013.01); *H04W 88/02* (2013.01)

(58) Field of Classification Search
CPC . H04W 76/27; H04W 52/0235; H04W 88/02; H04W 76/16; H04W 76/15; H04W 76/10; H04W 76/19; H04W 76/20; H04W 76/00; H04W 88/06; H04W 36/0066; H04W 36/0069; H04W 36/14; H04W 36/18; H04W 36/22; H04W 48/18
See application file for complete search history.

(56) References Cited

U.S. PATENT DOCUMENTS

| 5,627,882 A | 5/1997 | Chien et al. |
| 7,155,261 B2 | 12/2006 | Chen |
| 7,577,114 B2 | 8/2009 | Hsieh et al. |
| 8,032,547 B2 | 10/2011 | Willey |

(Continued)

FOREIGN PATENT DOCUMENTS

| IN | 201724038487 A | 5/2018 |
| WO | 2017213687 A1 | 12/2017 |

(Continued)

OTHER PUBLICATIONS

ShareTechnote, "Multi Cell Measurement in LTE," Nov. 12, 2016, p. 1-2, 21 https://www.sharetechnote.com/html/Handbook_LTE_MultiCell_Measurement_LTE.htm (Year: 2016).*

(Continued)

*Primary Examiner* — Maharishi V Khirodhar
*Assistant Examiner* — Kenneth P Hunt
(74) *Attorney, Agent, or Firm* — Amin, Turocy & Watson, LLP

(57) ABSTRACT

Power retention for 5G non-standalone devices can be accomplished via a process that comprises specific message data being sent to a mobile device. For example, although a mobile device can enable its new radio in response to communicating with a network cell that does not comprise a new radio functionality, a message can be sent to the mobile device to prevent the mobile device from enabling its new radio. Therefore, the mobile device can retain battery power simultaneously.

20 Claims, 12 Drawing Sheets

(56) References Cited

U.S. PATENT DOCUMENTS

| | | | |
|---|---|---|---|
| 8,527,014 B2 | 9/2013 | Amerga et al. | |
| 8,942,150 B2 | 1/2015 | Malladi et al. | |
| 9,220,064 B2 | 12/2015 | Deng | |
| 9,264,992 B2 | 2/2016 | Hsu et al. | |
| 9,294,926 B2 | 3/2016 | Pragada et al. | |
| 9,363,755 B2 | 6/2016 | Shrivastava et al. | |
| 9,398,634 B2 | 7/2016 | Schliwa-Bertling et al. | |
| 9,936,453 B1 | 4/2018 | Iyer et al. | |
| 9,942,852 B2 | 4/2018 | Hsu et al. | |
| 10,028,129 B2 | 7/2018 | Ly et al. | |
| 2004/0043797 A1 | 3/2004 | Shostak | |
| 2016/0056939 A1* | 2/2016 | Kim | H04L 5/0053 370/331 |
| 2016/0234774 A1 | 8/2016 | Vejlgaard et al. | |
| 2017/0013519 A1* | 1/2017 | Hahn | H04W 74/0833 |
| 2017/0201943 A1 | 7/2017 | Hsu et al. | |
| 2017/0289854 A1* | 10/2017 | Chang | H04W 76/27 |
| 2017/0290025 A1 | 10/2017 | Fukuta | |
| 2017/0374672 A1 | 12/2017 | Selvaganapathy et al. | |
| 2018/0007587 A1* | 1/2018 | Feldman | H04W 36/18 |
| 2018/0020366 A1 | 1/2018 | Martin et al. | |
| 2018/0049083 A1* | 2/2018 | Kubota | H04W 72/1215 |
| 2018/0054725 A1 | 2/2018 | Agiwal et al. | |
| 2018/0092085 A1 | 3/2018 | Shaheen et al. | |
| 2018/0103427 A1 | 4/2018 | Griot et al. | |
| 2018/0160370 A1 | 6/2018 | Alpert et al. | |
| 2018/0192426 A1 | 7/2018 | Ryoo et al. | |
| 2018/0220344 A1 | 8/2018 | Shaheen | |
| 2018/0270682 A1 | 9/2018 | Zacharias et al. | |
| 2018/0332659 A1* | 11/2018 | Hwang | H04W 76/10 |
| 2019/0098681 A1* | 3/2019 | Kwok | H04W 52/243 |
| 2019/0150039 A1 | 5/2019 | Raghunathan et al. | |
| 2019/0159053 A1* | 5/2019 | Tsuda | H04B 17/309 |
| 2019/0159110 A1* | 5/2019 | Takahashi | H04W 48/14 |
| 2019/0200245 A1 | 6/2019 | Khan et al. | |
| 2019/0268950 A1 | 8/2019 | Youtz et al. | |
| 2019/0313232 A1* | 10/2019 | Lee | H04W 4/90 |
| 2019/0342800 A1* | 11/2019 | Sirotkin | H04B 17/318 |
| 2019/0357069 A1* | 11/2019 | Harada | H04W 72/04 |
| 2019/0379469 A1 | 12/2019 | Lu et al. | |
| 2020/0067793 A1* | 2/2020 | Dribinski | H04W 36/00837 |

FOREIGN PATENT DOCUMENTS

| | | |
|---|---|---|
| WO | 2018029578 A1 | 2/2018 |
| WO | 2018144523 A1 | 8/2018 |

OTHER PUBLICATIONS

3GPP, "3GPP TS 36.331 V15.2.2,," Jun. 2018.*

Shih, Eugene, et al. "Wake on Wireless: An Event Driven Energy Saving Strategy for Battery Operated Devices." MOBICOM '02, Sep. 23-28, 2002. 12 pages.

"LTE; Evolved Universal Terrestrial Radio Access (E-UTRA); Radio Resource Control (RRC); Protocol specification" 3rd Generation Partnership Project, 3GPP TS 36.331 V15.3.0 (2018). 916 pages.

"3rd Generation Partnership Project; Technical Specification Group Services and System Aspects; Release 15 Description; Summary of Rel-15 Work Items." 3rd Generation Partnership Project., 3GPP TR 21.915 V0.3.0 (Sep. 2018). 92 pages.

Ericsson "5G indicator for EN-DC." 3GPP TSG-RAN WG2 #100, R2-1713443, 2017. 21 pages.

Qualcomm Incorporated, et al. "Consideration on the GSMA NR indication requirements." 3GPP TSG-RAN WG2 Meeting #101, 2018, R2-1803664. 3 pages.

Non-Final Office Action received for U.S. Appl. No. 16/142,593 dated Jun. 11, 2020, 46 pages.

"3rd Generation Partnership Project; Technical Specification Group Services and System Aspects; General Packet Radio Service (GPRS-);Service description; Stage 2 Release 15)" 3GPP, 3GPP TS 23.060 V15.5.0 (Dec. 2018), 367 pages.

"3rd Generation Partnership Project; Technical Specification Group Services and System Aspects; Circuit Switched (CS) fallback in Evolved Packet System (EPS); Stage 2 (Release 15)" 3GPP TS 23.272 V15.0.0 (Dec. 2017), 103 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 16)" 3GPP TS 23.401 V16.0.0 (Sep. 2018), 410 pages.

"3rd Generation Partnership Project; Technical Specification Group Services and System Aspects; Functional stage 2 description of Location Services (LCS) (Release 15)" 3GPP TS 23.271 V15.1.0 (Sep. 2018), 184 pages.

* cited by examiner

FACILITATION OF POWER RETENTION FOR 5G OR OTHER NEXT GENERATION NETWORK NON-STANDALONE DEVICES

TECHNICAL FIELD

This disclosure relates generally to facilitating of power retention for 5G non-standalone devices. For example, this disclosure relates to facilitating power retention for a 5G, or other next generation network, non-stand alone device by managing activity of a new radio.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to power retention is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
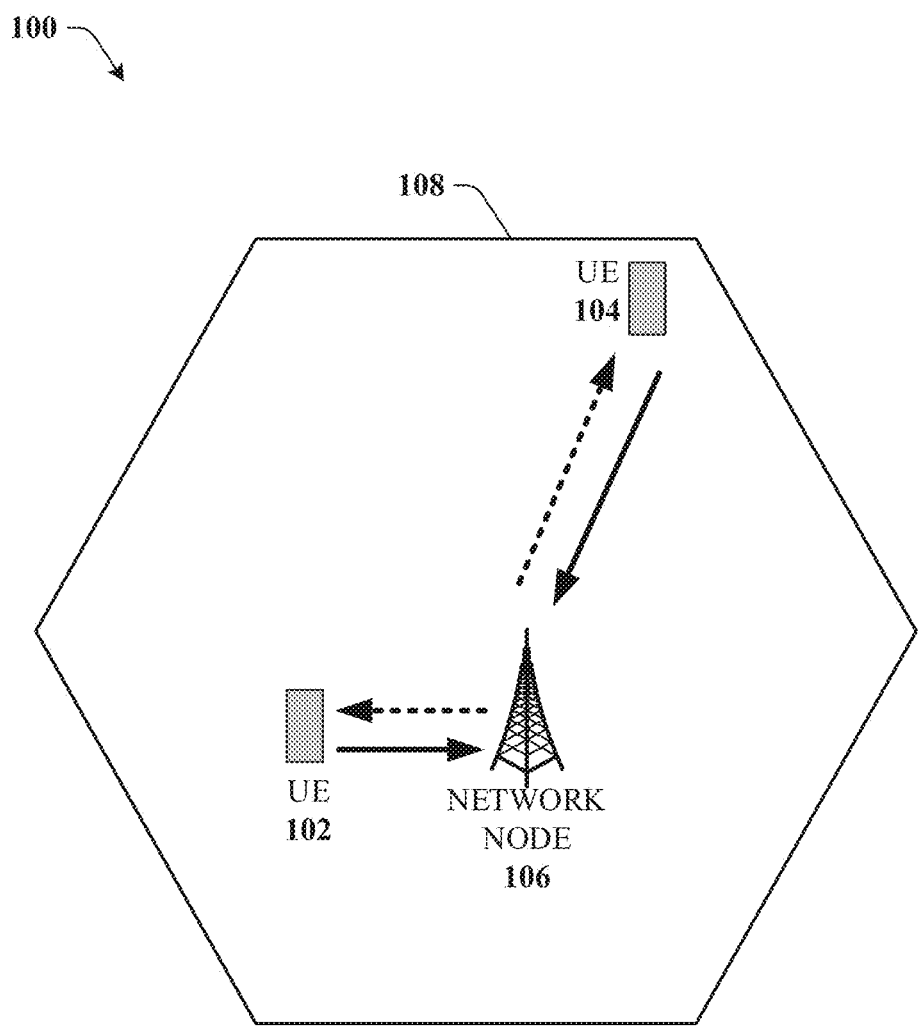
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate power retention for a 5G or other next generation network non-standalone devices. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate power retention for a 5G network. Facilitating power retention for a 5G non-standalone devices can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end. To meet the huge demand for data centric applications, 4G standards can be applied to 5G, also called new radio (NR) access. 5G NR can comprise lower frequencies, from 600 MHz to 100 GHz and higher speeds than 4G. The air interface defined by 3GPP for 5G is known as NR, and the spectrum is subdivided into two frequency bands, <6 GHz and mmWave, each with different capabilities.

5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

In certain scenarios, a cell cannot have an NR capability even if it indicates an NR capability within the cell. LTE cells surrounding cells that have NR can enable an element so that a UE can display a 5G icon to gage the probability of actually accessing NR cells. In this case, the UE radio can be enabled, thus draining battery power unnecessarily. This disclosure provides for the UE to turn on the 5G icon in response to receiving a SIB message comprising specific data (e.g., B1 message) instead of just turning on the 5G icon in response to receiving a SIB message from a non NR cell that is near an NR cell.

Power consumption can be extremely higher for non-standalone (NSA) 5G devices based on the LTE and 5G (especially mmW) being on separate radio frequency radios. Thus, battery power can be preserved based on a system information block (SIB) (e.g., SIB2) upper layer indication (e.g., "upperlayerindication") comprising network instructions known as B1 measurements (e.g., measurement message for inter-radio access technology (RAT)) with NR frequency bands to enable a 5G new radio (NR) radio. A 5G NR indicator can be added to indicate to the UE that an evolved universal terrestrial radio access (E-UTRAN) cell it is capable of supporting dual connectivity with a locally available NR secondary cell(s).

The upper layer indication is an information element (IE) that can indicate to the UE that an E-UTRA cell is capable of supporting an LTE-NR dual connectivity and an E-UTRA new radio dual connectivity (ENDC). This IE can be used by service providers to show a 5G icon on the UE. However, a device chipset vendor can use the IE to trigger and/or enable/disable the 5G NR radio. UEs that receive the new IE from an E-UTRA cell without active NR cells can consume unnecessary power. Thus, the upper layer indication (e.g., IE) can be used to enable/disable the 5G NR radio.

TABLE 1

UE state/indicator configuration matrix

| State | Config. A | Config. B | Config. C | Config. D |
|---|---|---|---|---|
| 1 (IDLE under or Connected to LTE cell not supporting NSA) | 4G | 4G | 4G | 4G |
| 2 (IDLE under or Connected to LTE cell supporting NSA and no detection of NR coverage) | 4G | 4G | 4G | 5G |
| 3 (Connected to LTE only under LTE cell supporting NSA and detection of NR coverage) | 4G | 4G | 5G | 5G |
| 4 (IDLE under LTE cell supporting NSA and detection of NR coverage) | 4G | 5G | 5G | 5G |
| 5 (Connected to LTE + NR under LTE cell supporting NSA) | 5G | 5G | 5G | 5G |
| 6 (IDLE under or connected to Next Generation-RAN while attached to 5G core) | 5G | 5G | 5G | 5G |

The different states column depicts the different states of the device based on whether the device is within LTE, the core network, or the RAN. The different configuration columns are different options that carriers can pick. In each of the configurations, it can be determined when and where to enable a 4G icon and/or a 5G icon. For instance, in configuration 2D, when the UE is in the LTE cell and does not detect an NR capability, the device can display the 5G icon to tell the user that there is 5G in the area and the likelihood of accessing NR 5G is high. Thus, as the UE transitions into a connective state or into an NR cell, then the icon can stay the same. However, when the UE is in a cell that does not provide a SIB indication B1 message, then the UE can display the 4G icon. Thus, viewing the bolded regions of Table 1 in a downward leftward perspective, the likelihood of accessing a 5G service zone increases. This can also reduce a number of times the UE toggles back and forth between the 4G icon and the 5G icon.

Because initial 5G deployment can be sparse and take years to implement, in NSA options 3×mmWave deployment architectures, if few 5G cells are deployed initially within the LTE macro cell, then the mmWave cell range can be short compared to LTE. In addition, in order to align a 5G tracking area with Federal Communications Commission (FCC) spectrum county lines and avoid alternating between 4G and 5G icon displays, some LTE macro cells without 5G cells can broadcast the IE.

Thus, 5G capable UEs that receive/decode the IE can turn on their NR radio and consume unnecessary UE power even in the LTE only cells. To save UE battery life and address the issue of wasting UE power, when the 5G capable UE receives IE in a SIB, the UE can determine not to turn on the NR radio. However, if there is a B1 measurement instruction from network, then the UE can enable the NR radio. Thus, instead of solely relying on the SIB, the NR radio can be turned on if the UE receives the B1 measurement instruction comprising and NR band from the network.

In one embodiment, described herein is a method comprising, receiving, by a mobile device comprising a processor, first radio resource reconfiguration data representative of a first radio resource reconfiguration in response to sending a radio resource control signal to a wireless network device, wherein the first radio resource reconfiguration data comprises a system information block and inter-radio access technology data associated with an inter-access radio technology. Additionally, the method can comprise sending, by the mobile device to the wireless network device, an indication that the radio resource reconfiguration has been completed in response to the receiving the first radio resource reconfiguration data. Furthermore, the method can comprise enabling, by the mobile device, a communication of a new radio of the mobile device with the new radio wireless network device in response to receiving second radio resource reconfiguration data associated with the new radio wireless network device.

According to another embodiment, a system can facilitate, receiving a radio resource control signal from a mobile device, and in response to the receiving the radio resource control signal from the mobile device, the system can facilitate sending first radio resource configuration data representative of a first radio resource configuration to the mobile device. In response to the facilitating the sending the first radio resource configuration data to the mobile device, the system can comprise receiving an indication that the radio resource configuration has been completed by the mobile device. Additionally, in response to the receiving the indication that the radio resource configuration has been completed, the system can comprise facilitating using a new radio of the mobile device to communicate with a new radio wireless network device.

According to yet another embodiment, described herein is a machine-readable storage medium that can perform the operations comprising in response to receiving a radio resource control signal from a mobile device, the machine-readable storage medium can perform the operations comprising sending radio resource configuration data representative of a radio resource configuration to the mobile device, wherein the radio resource configuration data comprises indication data representative of a first indication representative of an upper layer of a wireless network device. Additionally, in response to the sending the radio resource configuration data to the mobile device, the machine-readable storage medium can perform the operations comprising receiving a second indication that a radio resource reconfiguration has been completed by the mobile device. Furthermore, based on the second indication, the machine-readable storage medium can perform the operations comprising receiving measurement data representative of a measurement associated with the upper layer.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP)

networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
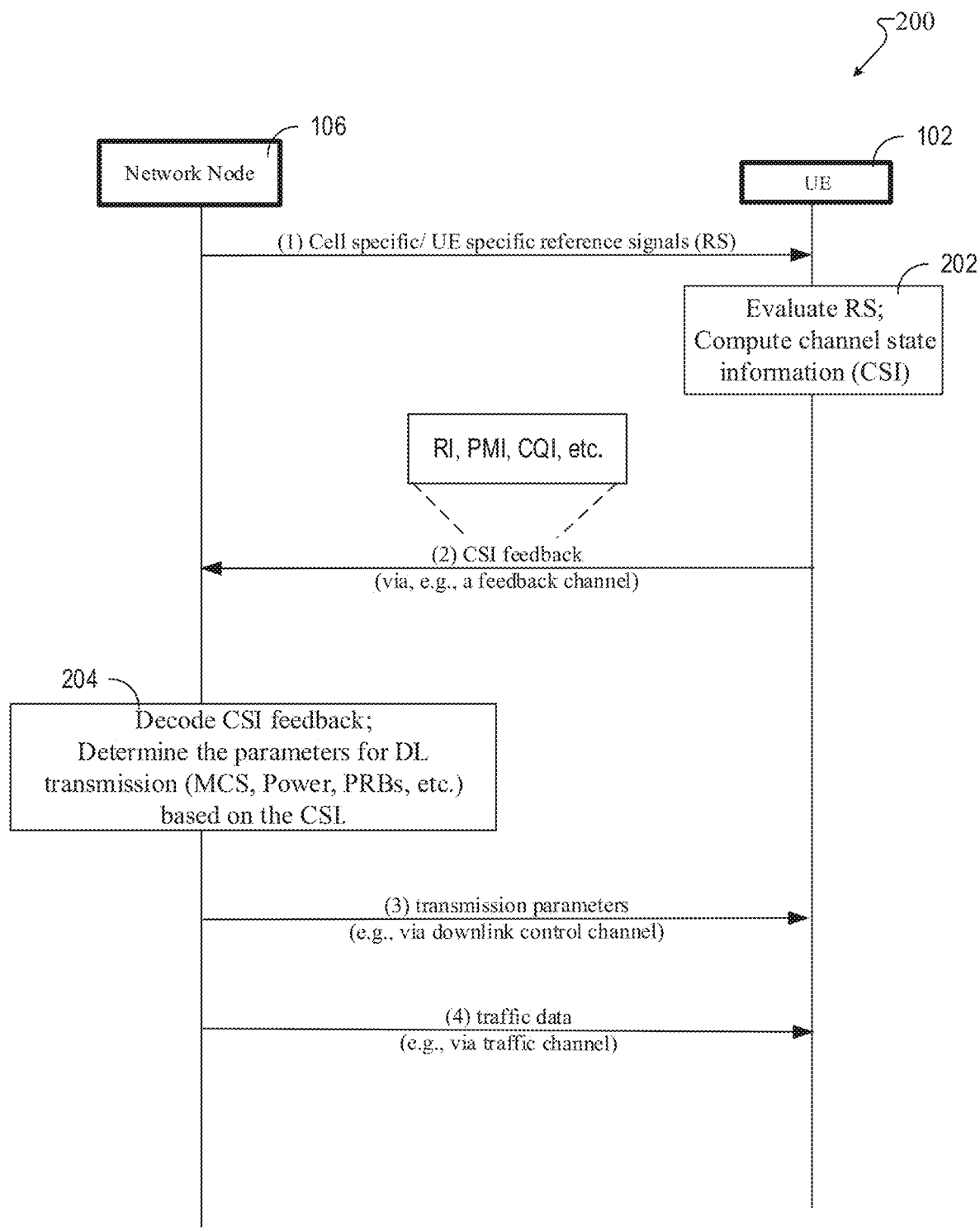
FIG. 2 illustrates an example schematic system block diagram of a message sequence chart between a network node and user equipment according to one or more embodiments.

FIG. 2 depicts a message sequence chart for downlink data transfer in 5G systems 200. The network node 106 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 106 via a feedback channel either on request from the network node 106, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 106 and then sent over to the user equipment 102 as a part of the downlink control channel data. The network node 106 can transmit the scheduling parameters, comprising the adjusted densities, to the user equipment 102 via the downlink control channel. Thereafter and/or simultaneously, data can be transferred, via a data traffic channel, from the network node 106 to the user equipment 102.

Figure 3:
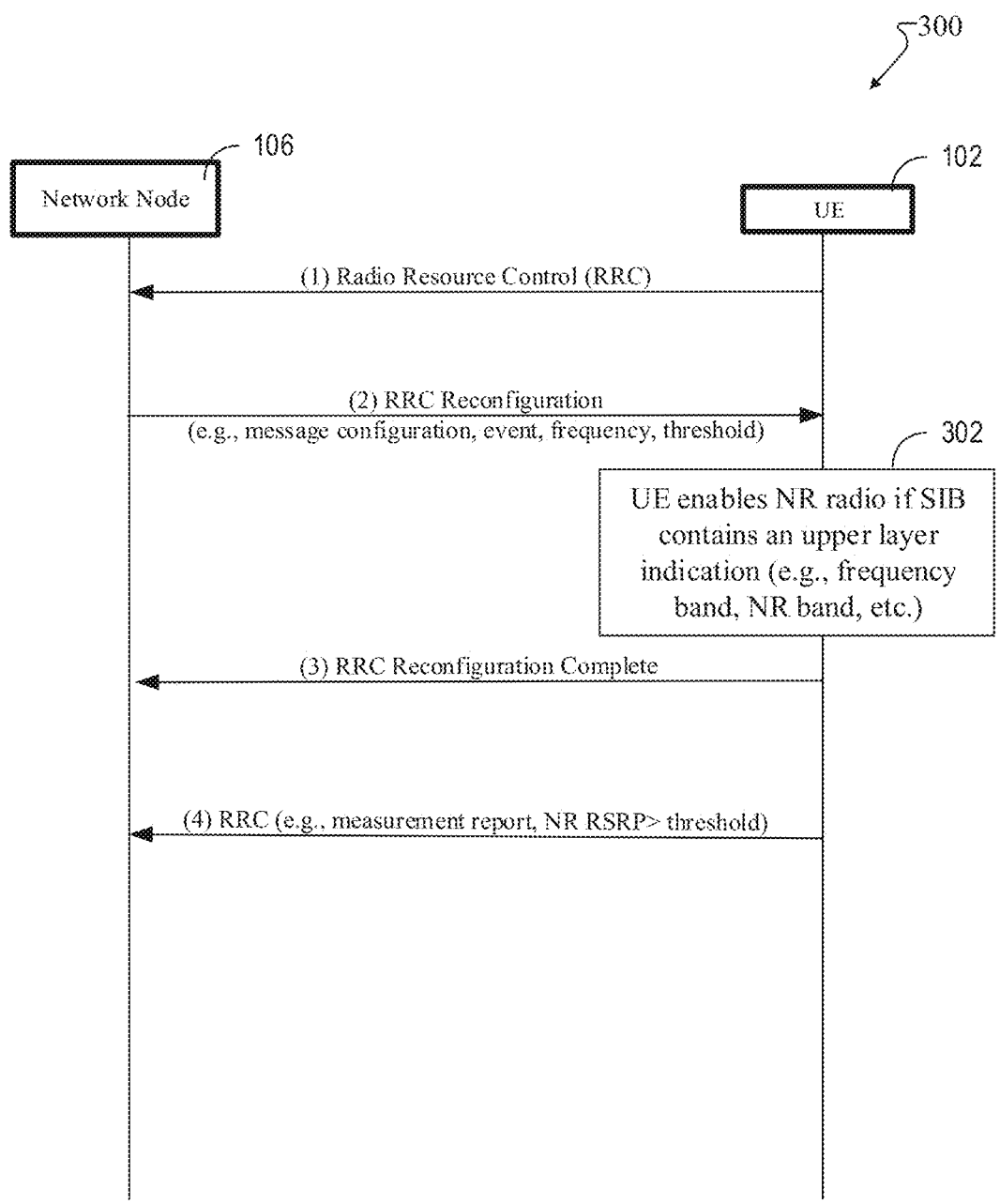
FIG. 3 illustrates an example schematic system block diagram of a message sequence chart utilizing an upper layer indication between a network node and user equipment according to one or more embodiments.

Referring now to FIG. 3, illustrated is an example schematic system block diagram of a message sequence chart utilizing an upper layer indication between a network node and user equipment according to one or more embodiments.

The UE 102 can transmit a radio resource control (RRC) signal (1) to the network node 106 (e.g., eNB) to initiate communication with the network node. In response to the UE 102 transmitting the radio resource control signal (1) to the network node 106, the network node 106 can transmit an RRC reconfiguration (2) signal to the UE 102. The RRC reconfiguration signal can comprise data associated with a system information block, B1 measurements, event ID, a frequency, a bandwidth, and/or a threshold associated with the power retention process. Based on receiving the RRC reconfiguration signal, the UE 102 can enable a new radio of the UE 102 at block 302 if the system information block contains an upper layer indication. After the reconfiguration, the UE 102 can measure the NR so that if a threshold is met, then a B1 event can be sent to the network node 106. The upper layer indication can comprise a frequency band, a new radio band, etc. The UE 102 can then transmit RRC reconfiguration complete (3) signal to the network node 106 to indicate to the network node 106 that a reconfiguration has taken place. Furthermore, the UE 102 can transmit an additional RRC (4) signal comprising measurement report data, a new radio reference signal received power (RSRP), a threshold value compared to the RSRP, etc., to the network node 106.

Figure 4:
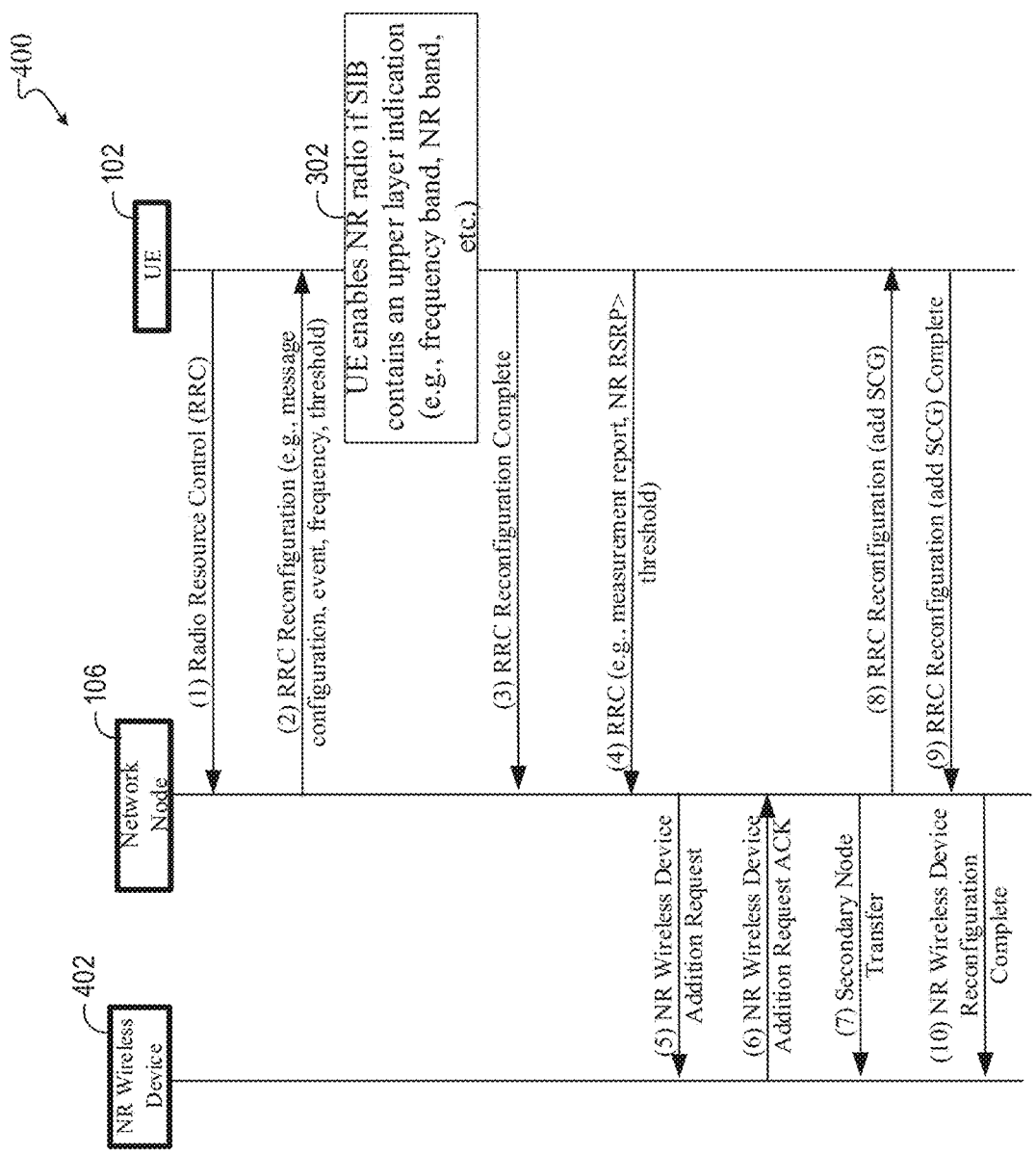
FIG. 4 illustrates an example schematic system block diagram of a message sequence chart utilizing an upper layer indication between a network node and user equipment based on new radio wireless device communication according to one or more embodiments.

Referring now to FIG. 4, illustrated is an example schematic system block diagram of a message sequence chart utilizing an upper layer indication between a network node and user equipment based on new radio wireless device communication according to one or more embodiments. The UE 102 can transmit a radio resource control (RRC) signal (1) to the network node 106 (e.g., eNB) to initiate communication with the network node. In response to the UE 102 transmitting the radio resource control signal (1) to the network node 106, the network node 106 can transmit an RRC reconfiguration (2) signal to the UE 102. The RRC reconfiguration signal can comprise data associated with a system information block, B1 measurements, event ID, a frequency, a bandwidth, and/or a threshold associated with the power retention process. Based on receiving the RRC reconfiguration signal, the UE 102 can enable a new radio of the UE 102 at block 302 if the system information block contains an upper layer indication. After the reconfiguration, the UE 102 can measure the NR so that if a threshold is met, then a B1 event can be sent to the network node 106. The upper layer indication can comprise a frequency band, a new radio band, etc. The UE 102 can then transmit RRC reconfiguration complete (3) signal to the network node 106 to indicate to the network node 106 that a reconfiguration has taken place. Furthermore, the UE 102 can transmit an additional RRC (4) signal comprising measurement report data, new radio RSRP>threshold, etc., to the network node 106. Thereafter, the network node 106 can add the NR wireless device 402 (e.g., SgNB) to communications by sending an NR wireless device 402 addition request (5) to the NR wireless device 402. The NR wireless device 402 can then send an NR wireless device addition request acknowledgment (6) signal to the network node 106, thus prompting a secondary node transfer (7) signal to be sent from the network node 106 to the NR wireless device 402. The network node 106 can then send this information to the UE 102 in the form of another RRC reconfiguration (8) signal comprising second cell group (SCG) data. With this information, the UE 102 can confirm that it is ready for communication with the NR wireless device 402 by transmitting an RRC reconfiguration complete (9) signal to the network node 106. Consequently, this allows the network node 106 to send an NR wireless device 402 reconfiguration complete (10) signal to the NR wireless device 402.

Figure 5:
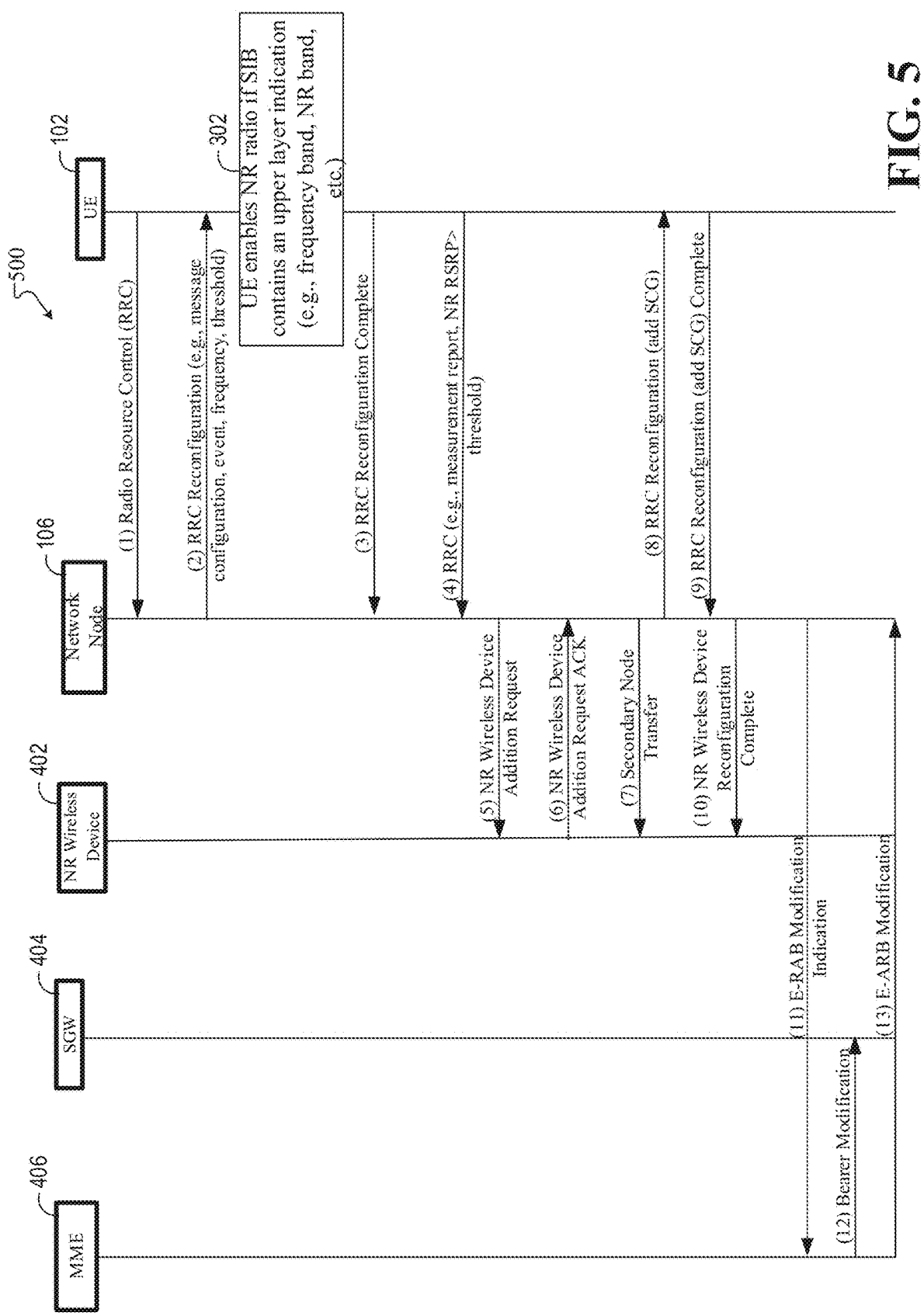
FIG. 5 illustrates an example schematic system block diagram of a message sequence chart utilizing an upper layer indication between a network node and user equipment based on new radio wireless device and mobility management entity communication according to one or more embodiments.

Referring now to FIG. 5 illustrates an example schematic system block diagram of a message sequence chart utilizing an upper layer indication between a network node and user equipment based on new radio wireless device and mobility management entity communication according to one or more embodiments. The UE 102 can transmit a radio resource control (RRC) signal (1) to the network node 106 (e.g., eNB) to initiate communication with the network node. In response to the UE 102 transmitting the radio resource control signal (1) to the network node 106, the network node 106 can transmit an RRC reconfiguration (2) signal to the UE 102. The RRC reconfiguration signal can comprise data associated with a system information block, B1 measurements, event ID, a frequency, a bandwidth, and/or a threshold associated with the power retention process. Based on receiving the RRC reconfiguration signal, the UE 102 can enable a new radio of the UE 102 at block 302 if the system information block contains an upper layer indication. After the reconfiguration, the UE 102 can measure the NR so that if a threshold is met, then a B1 event can be sent to the network node 106. The upper layer indication can comprise a frequency band, a new radio band, etc. The UE 102 can then transmit RRC reconfiguration complete (3) signal to the network node 106 to indicate to the network node 106 that a reconfiguration has taken place. Furthermore, the UE 102 can transmit an additional RRC (4) signal comprising measurement report data, new radio reference signal received power (RSRP) compared to a threshold data, etc., to the network node 106. Thereafter, the network node 106 can add the NR wireless device 402 (e.g., SgNB) to communications by sending an NR wireless device addition request (5) to the NR wireless device 402. The NR wireless device 402 can then send an NR wireless device addition request acknowledgment (6) signal to the network node 106, thus prompting a secondary node transfer (7) signal to be sent from the network node 106 to the NR wireless device 402. The network node 106 can then send this information to the UE 102 in the form of another RRC reconfiguration (8) signal comprising second cell group (SCG) data. With this information, the UE 102 can confirm that it is ready for communication with the NR wireless device 402 by transmitting an RRC reconfiguration complete (9) signal to the network node 106. Consequently, this allows the network node 106 to send an NR wireless device reconfiguration complete (10) signal to the NR wireless device 402. Since the gNB is available, it can be added as a send cell. Therefore, the radio access bearer (RAB) from the network node 106 (e.g., LTE) (e.g., master cell group bearer) to a mobility management entity (MME) 406 (e.g., split data bearer) can also be reconfigured in response to an E-UTRA RAB modification indication (11) signal being sent from the network node 106 to the MME 406. The MME can change the bearer via a bearer modification and send a bearer modification (12) signal to an SGW 404 and let the network node 106 know that the bearer has been modified via an E-RAB modification (13) signal. The MME 406 can also let the NR wireless device 402 know that the E-RAB has been modified.

Figure 6:
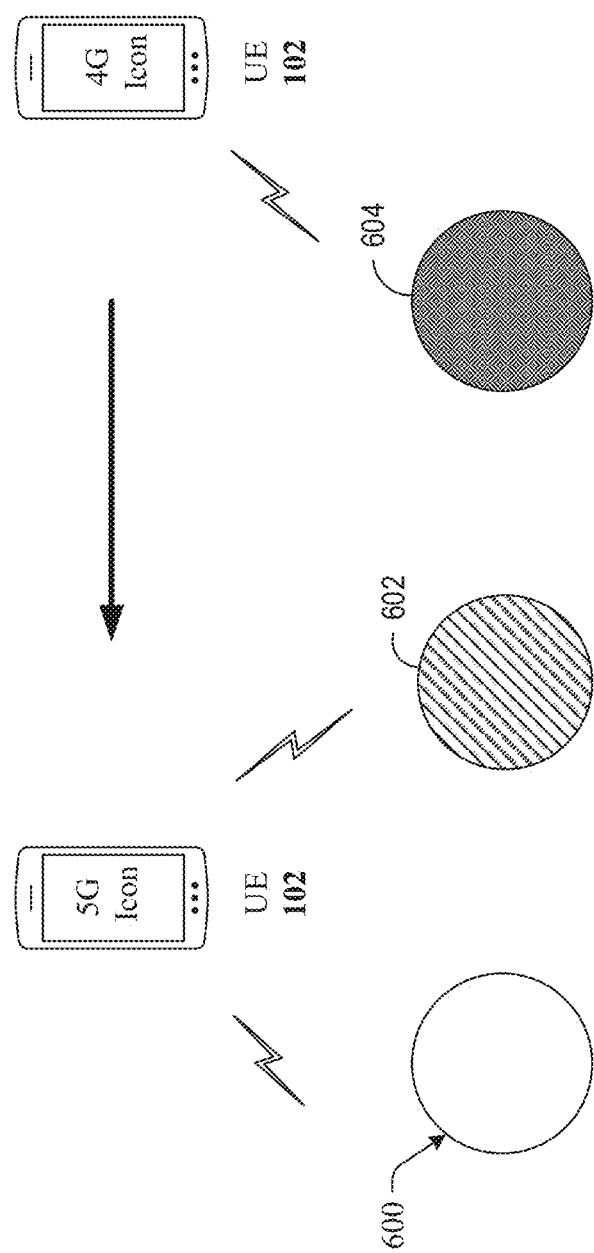
FIG. 6 illustrates an example schematic system block diagram of user equipment display icons based on network cell communication according to one or more embodiments.

Referring now to FIG. 6, illustrated is an example schematic system block diagram of user equipment display icons based on network cell communication according to one or more embodiments. An LTE cell 604 can have a SIB element not present, an LTE cell 602 can have a SIB element enabled, and an LTE plus NR cell 600 can have a SIB element enabled. Thus, as the UE 102 transitions from the LTE cell 604 with a SIB element not present to the LTE cell 602 with the SIB element enabled, the UE display screen can transition between displaying a 4G icon and a 5G icon because the LTE cell 602 is neighboring (e.g., near a location and/or next layer out) the LTE plus NR cell 600. However, as the UE 102 transitions between the LTE cell 602 with the SIB element enabled and the LTE plus NR cell 600 with the SIB element enabled, the display screen the UE can continue to display the 5G icon.

Figure 7:
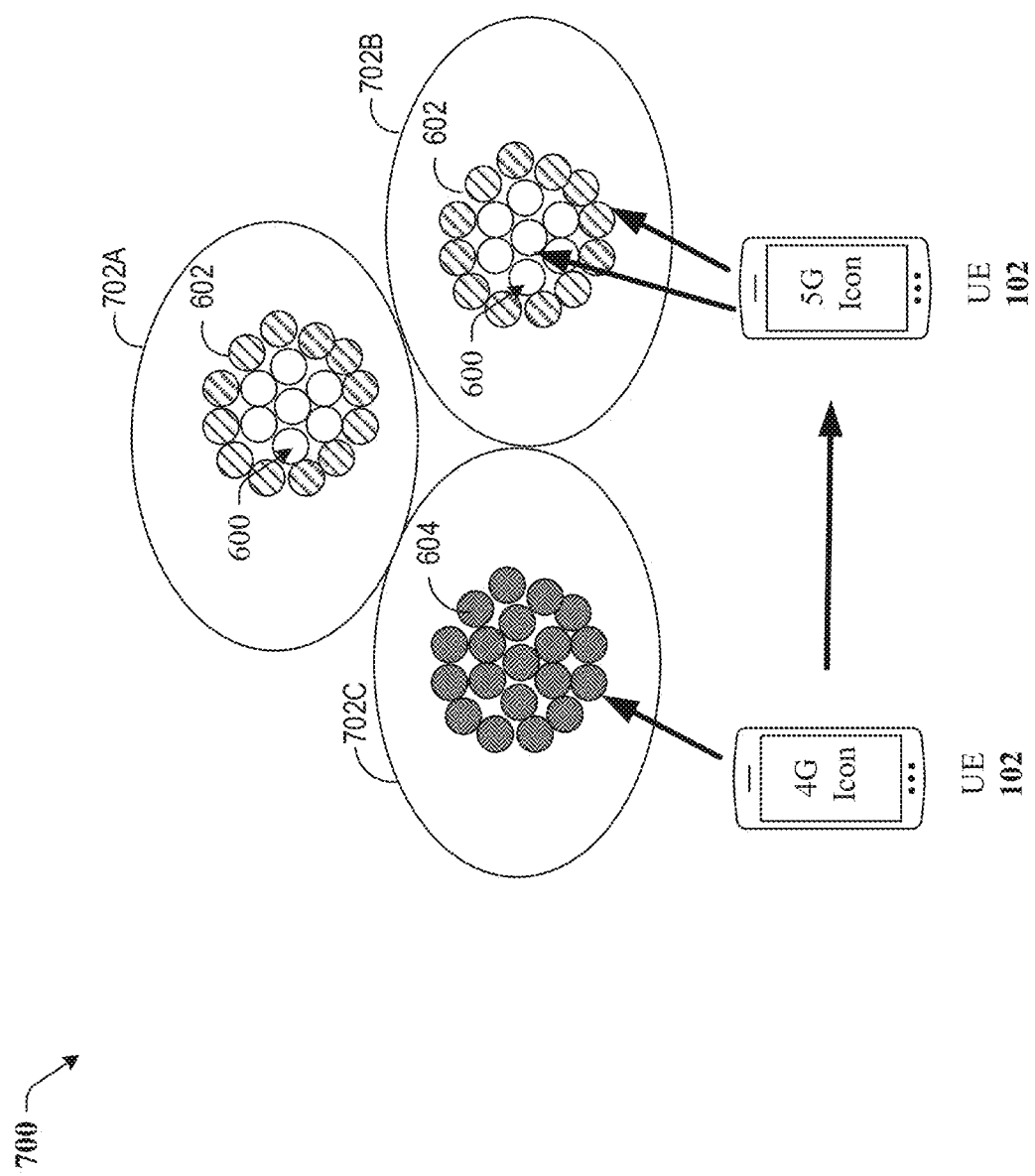
FIG. 7 illustrates an example schematic system block diagram of user equipment display icons based on network cell communication according to one or more embodiments.

Referring now to FIG. 7, illustrated is an example schematic system block diagram of user equipment display icons based on network cell communication according to one or more embodiments. FIG. 7 depicts various services areas 702A, 702B, 702C within the wireless network 700. Initially, at a time T1, the UE 102 can be communicating with LTE cells 604 that do not have a SIB element present within service area 702C. Therefore, the display screen of the UE 102 can display a 4G icon. However, as the UE 102 transitions to service areas 702A, 702B at time T2, the UE 102 can begin communication with the LTE cells 602 with the SIB element enabled even though they do not possess an NR functionality. However, because the LTE cells 602 are near the LTE plus NR cells 600 that have a SIB element enabled, then the UE 102 can display a 5G icon whether the UE 102 is communicating with the LTE cells 602 and/or the LTE plus NR cells 600. It should be understood that any configuration of LTE cells 600, 602, 604 is possible regardless of whether the SIB element is present or not. The difference manifests itself based on which of the LTE cells 600, 602, 604 the UE 102 is in communication with.

Figure 8:
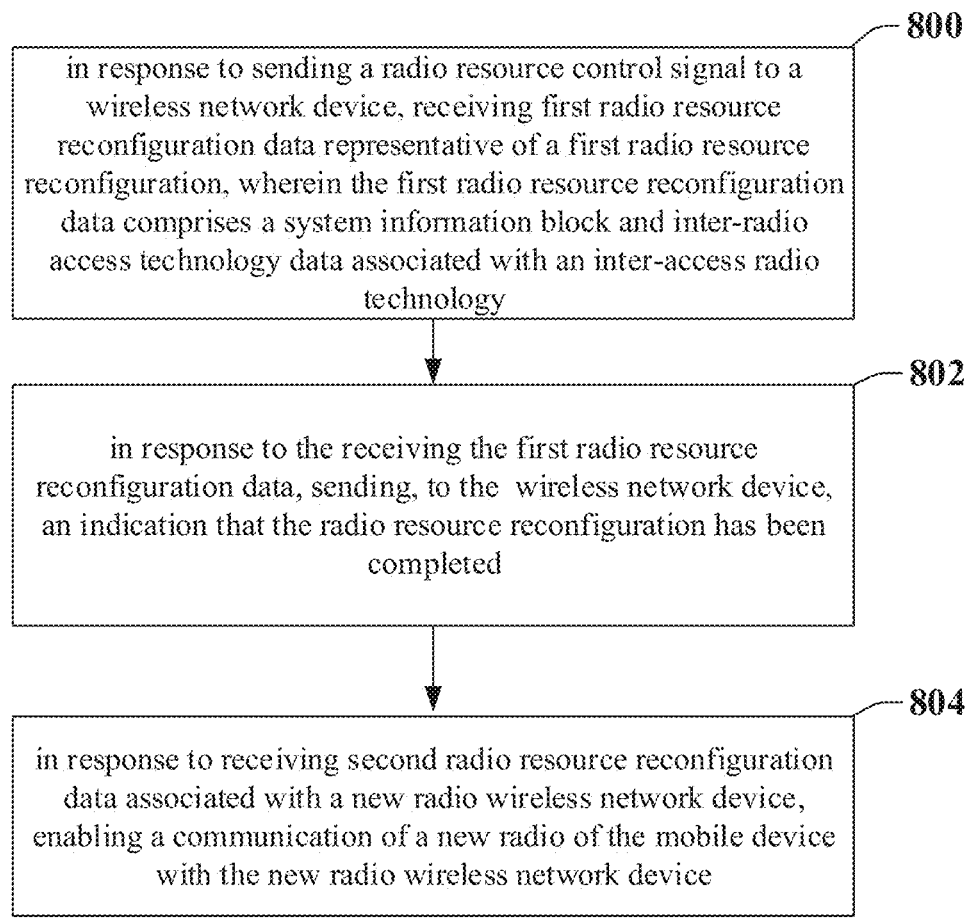
FIG. 8 illustrates an example flow diagram for a method for facilitating user equipment power retention for a 5G network according to one or more embodiments.

Referring now to FIG. 8, illustrated is an example flow diagram for a method for facilitating user equipment power retention for a 5G network according to one or more embodiments. At element 800, a method can comprise, receiving (e.g., via the UE 102) first radio resource reconfiguration data representative of a first radio resource reconfiguration in response to sending a radio resource control signal to a wireless network device (e.g., network node 106), wherein the first radio resource reconfiguration data comprises a system information block and inter-radio access technology data associated with an inter-access radio technology. Additionally, at element 802, the method can comprise sending (e.g., via the UE 102) an indication that the radio resource reconfiguration has been completed in response to the receiving the first radio resource reconfiguration data. Furthermore, at element 804, the method can comprise enabling a communication of a new radio of the mobile device (e.g., via the UE 102) with the new radio wireless network device (e.g., NR wireless device 402) in response to receiving second radio resource reconfiguration data associated with the new radio wireless network device.

Figure 9:
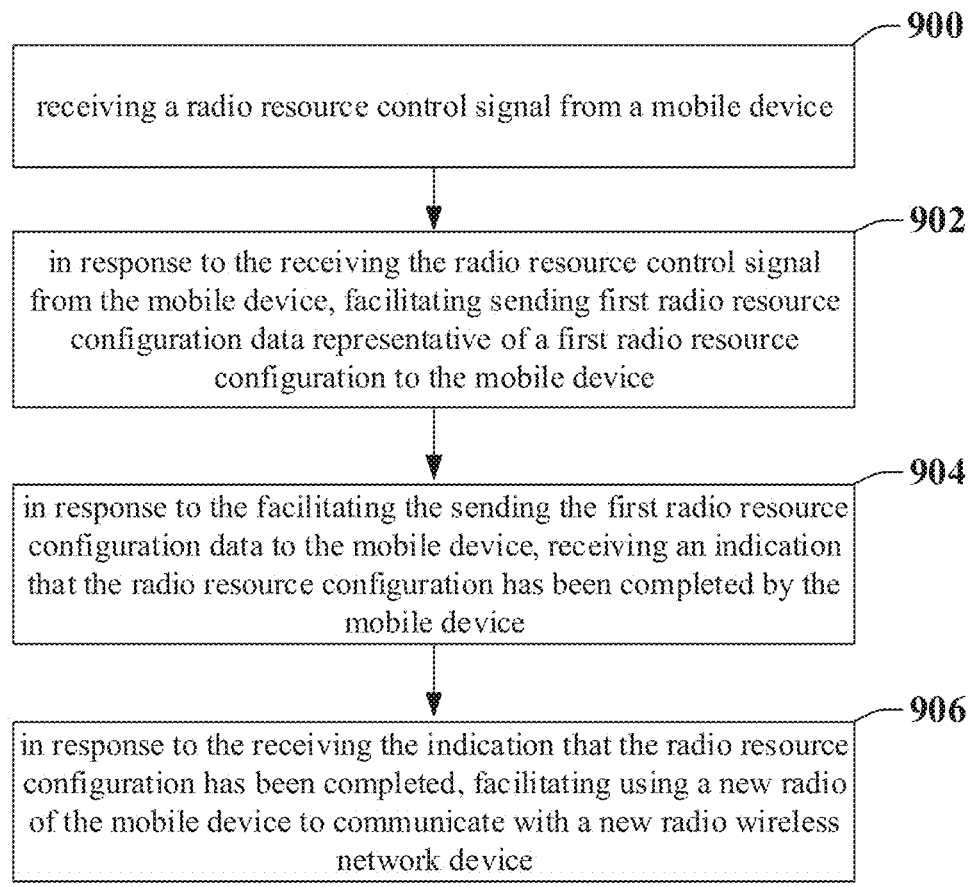
FIG. 9 illustrates an example flow diagram for a system for facilitating user equipment power retention for a 5G network according to one or more embodiments.

Referring now to FIG. 9, illustrates an example flow diagram for a system for facilitating user equipment power retention for a 5G network according to one or more embodiments. At element 900, a system can facilitate, receiving a radio resource control signal from a mobile device (e.g., UE 102), and at element 902, in response to the receiving the radio resource control signal from the mobile device (e.g., UE 102), the system can facilitate sending first radio resource configuration data representative of a first radio resource configuration to the mobile device (e.g., UE 102). In response to the facilitating the sending the first radio resource configuration data to the mobile device (e.g., UE 102), the system can comprise receiving an indication that the radio resource configuration has been completed by the mobile device (e.g., UE 102) at element 904. Additionally, in response to the receiving the indication that the radio resource configuration has been completed, the system can comprise facilitating using a new radio of the mobile device (e.g., UE 102) to communicate with a new radio wireless network device (e.g., NR wireless device 402) at element 906.

Figure 10:
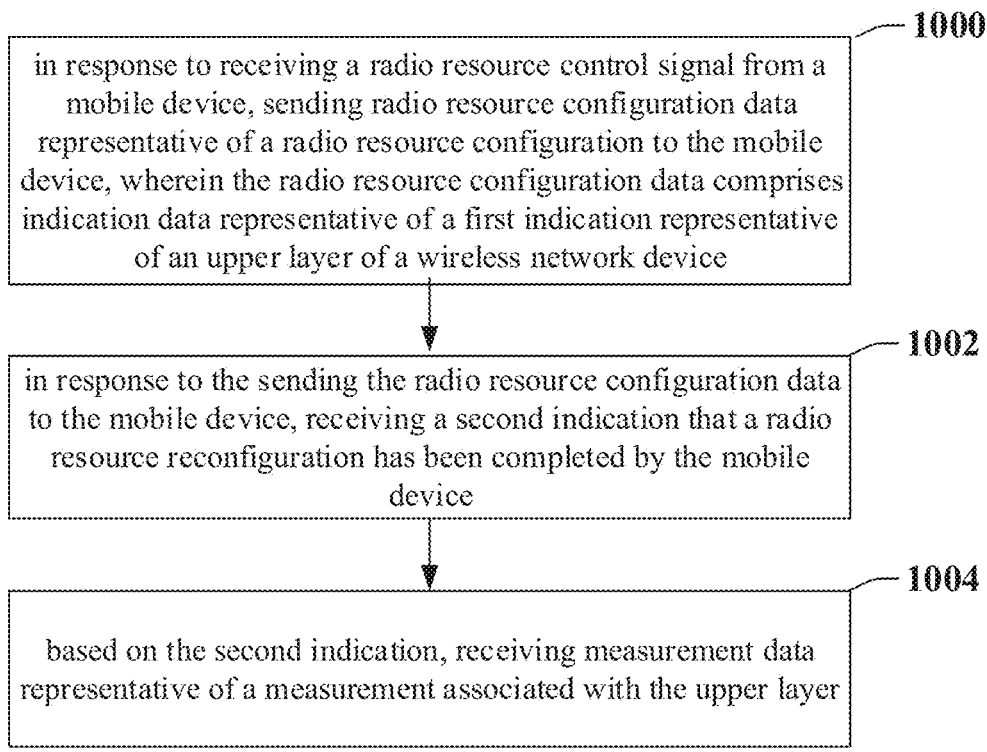
FIG. 10 illustrates an example flow diagram for a machine-readable medium for facilitating user equipment power retention for a 5G network according to one or more embodiments.

Referring now to FIG. 10, illustrated is an example flow diagram for a machine-readable medium for facilitating user equipment power retention for a 5G network according to one or more embodiments. At element 1000, a machine-readable storage medium can perform the operations comprising in response to receiving a radio resource control signal from a mobile device (e.g., UE 102) sending (e.g., via network node 106) radio resource configuration data representative of a radio resource configuration to the mobile device (e.g., UE 102), wherein the radio resource configuration data comprises indication data representative of a first indication representative of an upper layer of a wireless network device (e.g., network node 106). Additionally, at element 1002, in response to the sending the radio resource configuration data to the mobile device (e.g., UE 102), the machine-readable storage medium can comprise receiving a second indication that a radio resource reconfiguration has been completed by the mobile device (e.g., UE 102). Furthermore, based on the second indication, the machine-readable storage medium can perform the operations comprising receiving (e.g., via UE 102) measurement data representative of a measurement associated with the upper layer at element 1004.

Figure 11:
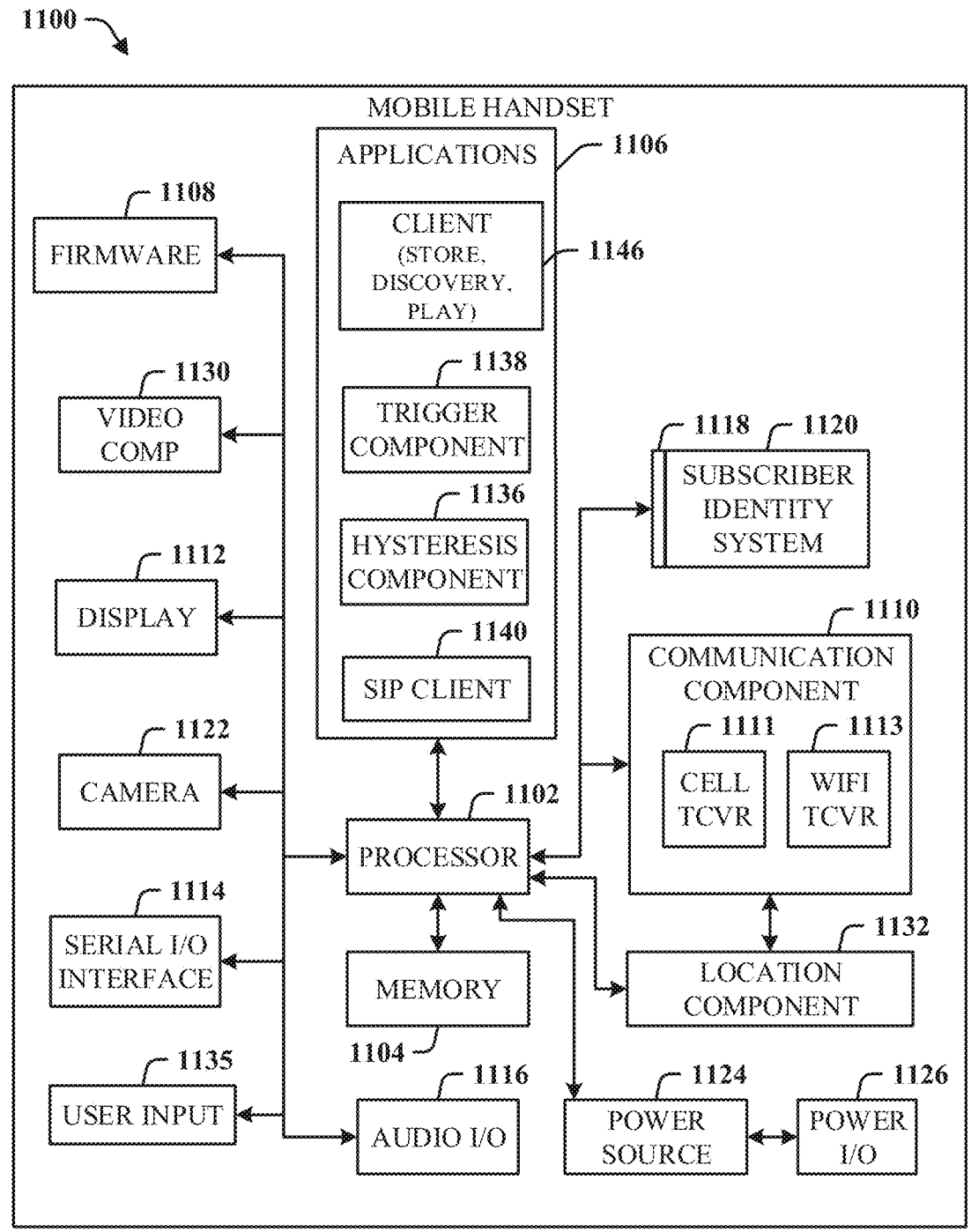
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
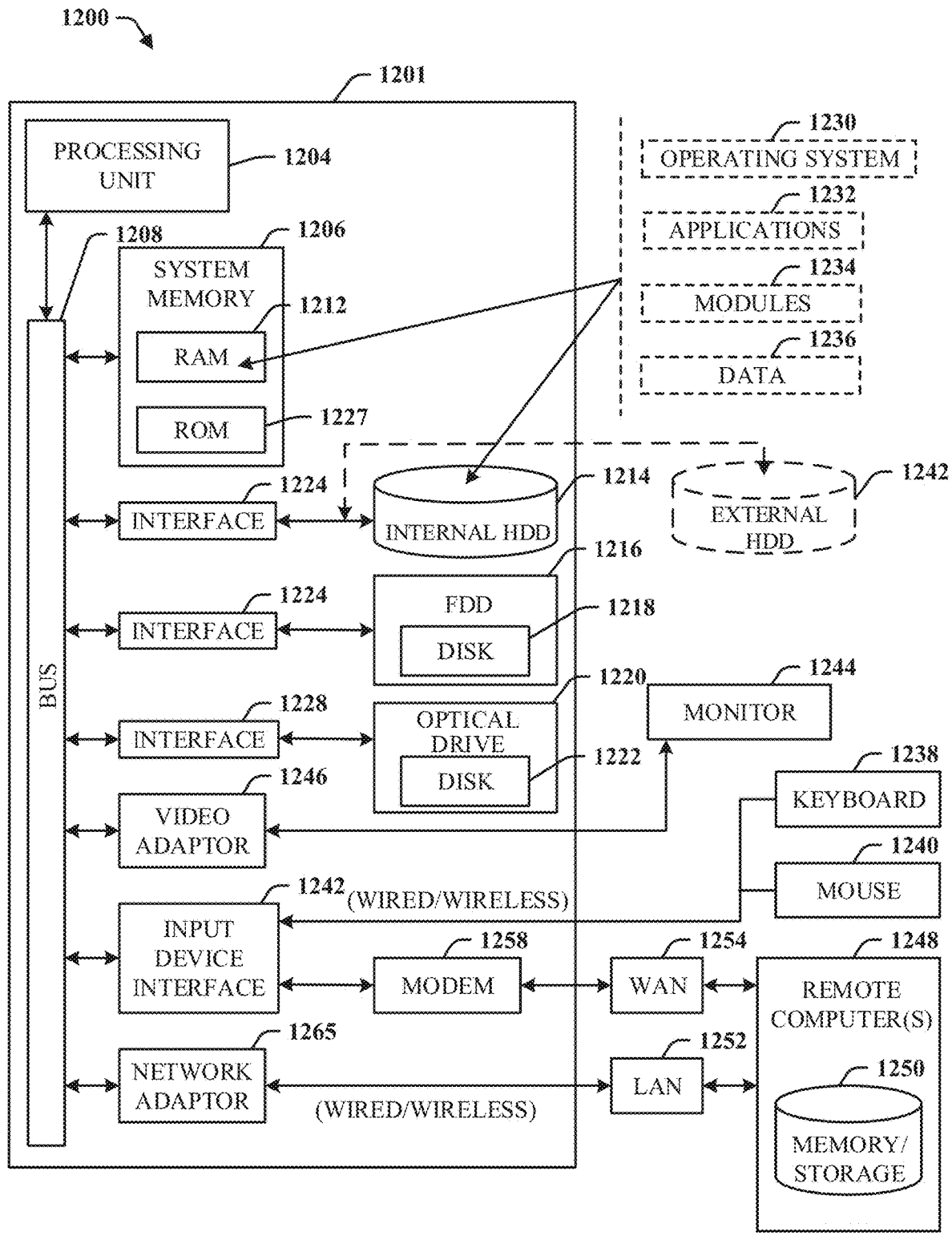
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

5G capable UEs that receive/decode an IE will turn on the NR radio and consume unnecessary UE power in the LTE only cells. There is currently not a power saving mechanism available to smartly turn on/off the NR radio in either 3GPP specifications or vendor implementations. Thus, this disclosure presents an improvement over the current state of the art by allowing the network node 106 to communicate specific information (e.g., B1 message) to the mobile device 102.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   in response to receiving system information block data representative of a first system information block from a non-new radio network equipment, preventing, by a user equipment comprising a processor, display of an icon indicative of a fifth generation communication network via a display screen of the user equipment;
   in response to sending a radio resource control signal to a new radio network equipment, receiving, by the user equipment comprising a processor, first radio resource reconfiguration data representative of a first radio resource reconfiguration, wherein the first radio resource reconfiguration data comprises a second system information block comprising B1 data and inter-radio access technology data associated with an inter-access radio technology;
   in response to receiving the second system information block comprising B1 data, displaying, by user equipment, the icon indicative of the fifth generation communication network via the display screen of the user equipment, wherein the new radio network equipment does not support new radio communication, and wherein the new radio network equipment is adjacent to the non-new radio network equipment,
   in response to receiving the first radio resource reconfiguration data:
   initializing, by the user equipment, a communication channel of a new radio of the user equipment with new radio network equipment, and
   sending, by the user equipment to the a new radio network equipment, a first indication that a radio resource reconfiguration has been completed;
   measuring, by the user equipment, the communication channel of the new radio, resulting in a communication channel measurement;
   sending, by the user equipment to the non-new radio network equipment, radio signal reception power data representative of a received power of a radio reference signal, of the user equipment, associated with the communication channel measurement; and
   in response to receiving second radio resource reconfiguration data associated with the new radio network equipment, wherein the second radio resource reconfiguration data comprises second cell group data representative of a second cell group, sending, by the user equipment to the non-new radio network equipment, a second indication that a second radio resource reconfiguration has occurred in accordance with the second cell group.

2. The method of claim 1, wherein the radio resource control signal is a first radio resource control signal, and further comprising:
   in response to receiving the first radio resource reconfiguration data, sending, by the user equipment to the non-new radio network equipment, a second radio resource control signal.

3. The method of claim 2, wherein the second radio resource control signal comprises measurement data associated with the inter-access radio technology.

4. The method of claim 1, wherein the radio resource control signal is a first radio resource control signal, and further comprising:
   in response to initializing the new radio, sending, by the user equipment to the non-new radio network equipment, a second radio resource control signal.

5. The method of claim 4,
   wherein the inter-radio access technology data comprises frequency band data associated with a frequency band of the new radio network equipment.

6. The method of claim 1, wherein the new radio comprises a subdivided signal spectrum and the subdivided signal spectrum comprises a gigahertz spectrum and a millimeter wave spectrum.

7. The method of claim 1, wherein receiving the second radio resource reconfiguration data associated with the new radio network equipment is in response to the non-new radio network equipment receiving request acknowledgment data representative of a request acknowledgment from the new radio network equipment.

8. A system, comprising:
   a processor; and
   a memory that stores executable instructions that, when executed by the processor, facilitate performance of operations, comprising:
   receiving a radio resource control signal from a user equipment;
   in response to receiving the radio resource control signal from the user equipment, sending radio resource configuration data representative of a first radio resource configuration to the user equipment;
   in response to the sending of the radio resource configuration data to the user equipment, receiving an indication that the radio resource configuration has been completed by the user equipment; and
   in response to receiving the indication that the radio resource configuration has been completed, using a new radio of the user equipment to communicate with a new radio network equipment, and
   sending a radio addition request to the new radio network equipment;
   receiving from the user equipment, radio reference signal power data representative of a power associated with a radio reference signal received by the user equipment and to be utilized by the new radio network equipment;
   in response to sending of the radio addition request, receiving from the new radio network equipment acknowledgment data representative of an acknowledgment of the radio addition request;
   in response to receiving the new radio network equipment acknowledgement data, sending a secondary node transfer signal to the new radio network equipment;
   sending radio resource reconfiguration data in accordance with second cell group associated with the secondary node to the user equipment; and in response to receiving system information block data, representative of a system information block, from non-new radio network equipment within a proximity of the new radio network equipment, facilitating preventing display of an icon associated with a fifth generation communication network via a display screen of the user equipment.

9. The system of claim 8, wherein the radio resource configuration data comprises the system information block data.

10. The system of claim 8, wherein the radio resource configuration data comprises inter-radio access technology data associated with an inter-radio access technology.

11. The system of claim 10, wherein the inter-radio access technology data comprises radio band data associated with a radio band of the new radio network equipment.

12. The system of claim 10, wherein the inter-radio access technology data comprises frequency band data associated with a frequency band of the new radio network equipment.

13. The system of claim 10, wherein the operations further comprise:
in response to receiving the indication that the radio resource configuration has been completed, receiving measurement data associated with a measurement of inter-radio access technology data.

14. The system of claim 10, wherein the inter-radio access technology is an evolved universal terrestrial radio access technology.

15. A non-transitory machine-readable medium, comprising executable instructions that, when executed by a processor, facilitate performance of operations, comprising:
in response to receiving a radio resource control signal from a mobile device, sending first radio resource configuration data representative of a first radio resource configuration to the mobile device, wherein the first radio resource configuration data comprises upper layer data representative of an upper layer of network equipment, wherein the network equipment is not configured to communicate according to new radio network communication protocols;
in response to sending the first radio resource configuration data to the mobile device, receiving second radio resource configuration data representative of the radio resource configuration that has been completed by the mobile device;
receiving measurement data representative of a measurement associated with the upper layer, wherein the measurement data comprises radio reference signal power data representative of a radio reference signal received power to be utilized in response to a communication channel threshold value being determined to have been satisfied;
in response to receiving the measurement data, sending a radio addition request to new radio network equipment that is adjacent to the network equipment;
receiving from the new radio network equipment acknowledgment data representative of an acknowledgment of the radio addition request;
in response to receiving the new radio network equipment acknowledgement data, sending a secondary node transfer signal to the new radio network equipment;
sending radio resource reconfiguration data in accordance with second cell group associated with the secondary node to the mobile device; and
in response to sending system information block data to the mobile device, facilitating preventing a display of an icon corresponding to fifth generation network usage by the mobile device via a display screen of the mobile device.

16. The non-transitory machine-readable medium of claim 15, wherein the operations further comprise:
in response to receiving an indication that the radio resource configuration has been completed, facilitating enabling a new radio of the mobile device to communicate with the new radio network equipment.

17. The non-transitory machine-readable medium of claim 16, wherein facilitating the enabling of the new radio of the mobile device to communicate with the new radio network equipment comprises sending request data representative of a request for the mobile device to access the new radio network equipment to the new radio network equipment.

18. The non-transitory machine-readable medium of claim 17, wherein the operations further comprise:
in response to sending the request data to the new radio network equipment, receiving, from the new radio network equipment, acknowledgment data representative of an acknowledgment of the request for the mobile device to access the new radio network equipment.

19. The non-transitory machine-readable medium of claim 18, wherein the operations further comprise:
in response to receiving the acknowledgment data, sending transfer data representative of a transfer of the communication from the network equipment to the new radio network equipment.

20. The non-transitory machine-readable medium of claim 19, wherein the operations further comprise:
in response to receiving a third indication that a second radio resource configuration has been completed by the mobile device, sending the third indication that the second radio resource configuration has been completed by the mobile device to the new radio network equipment.

* * * * *